United States Patent Office 3,320,734
Patented May 23, 1967

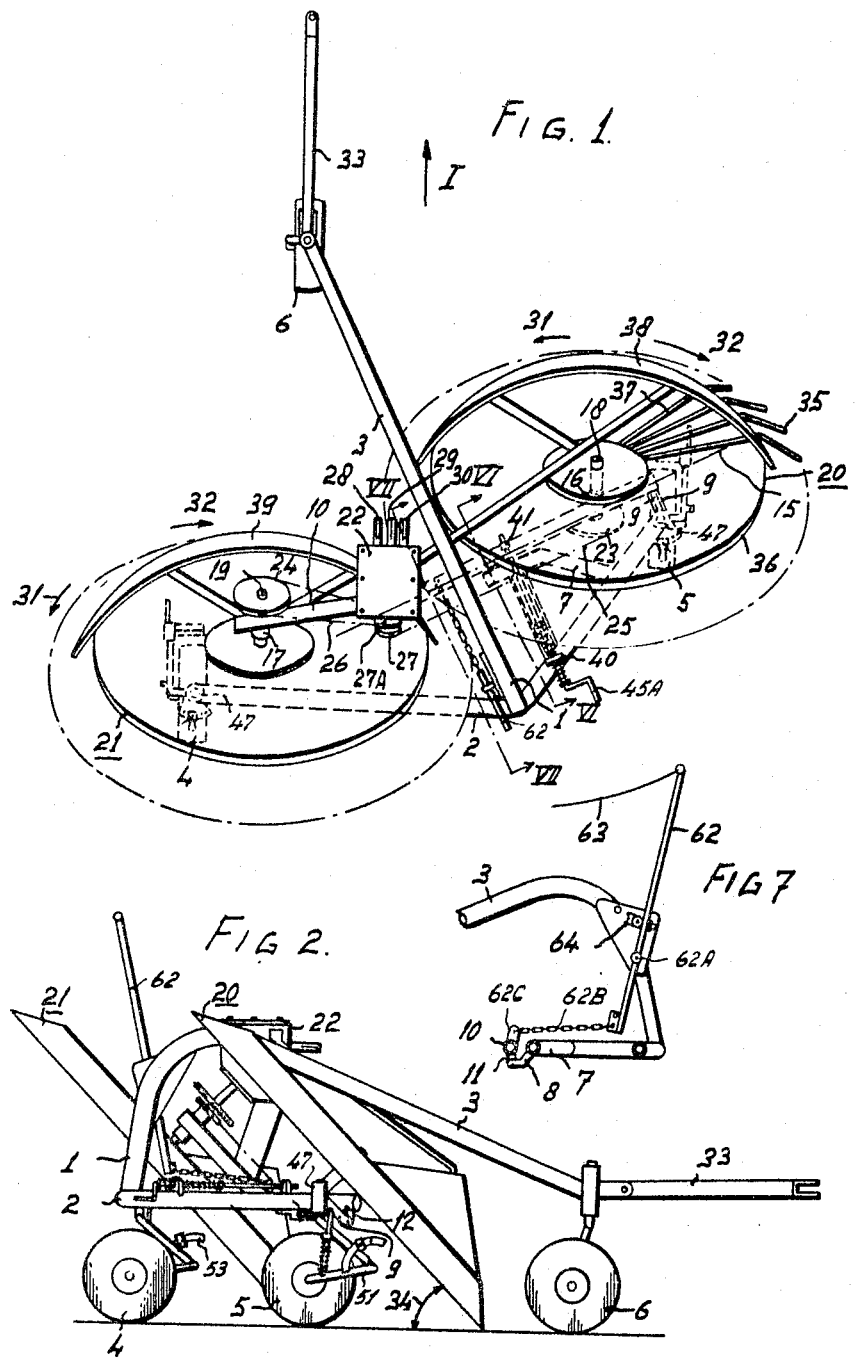

3,320,734
HAYMAKING MACHINES
Cornelis van der Lely, Zug, Switzerland, assignor to Patent Concern N.V., Curacao, Netherlands Antilles, a limited-liability company
Original application May 6, 1959, Ser. No. 811,445, now Patent No. 3,120,092, dated Feb. 4, 1964. Divided and this application Dec. 12, 1963, Ser. No. 330,082
Claims priority, application Netherlands, May 27, 1958, 228,135; May 28, 1958, 228,169
15 Claims. (Cl. 56—366)

This is a divisional application of my earlier application Ser. No. 811,445 filed May 6, 1959, now U.S. Patent No. 3,120,092.

This invention relates to haymaking machines.

In accordance with the invention there is provided a haymaking machine having a frame and a number of raking members, the raking members being rotatably arranged for movement of the tines in a plane which lies substantially transverse to the intended direction of travel of the implement, which plane is inclined to the horizontal in such a way that the tines of the rakng members can engage the ground and/or the crop lying thereon at the lower region of the members, from which region the plane extends upwardly and rearwardly with reference to the said intended direction of travel of the implement, the frame of the implement being situated for its major part to the offside of the raking members with respect to the ground and being provided with a beam situated transverse to the intended direction of travel of the implement, which beam is provided with a number of bearings for the axes of rotation of the raking members, the axes of these bearings extending downwardly, said bearings being held in position over the ground solely by virtue of their connection to said frame beam.

For a better understanding of the invention and to show how the same may be carried into effect, reference will now be made, by way of example, to the accompanying drawings in which:

FIGURE 1 is a plan view of a first embodiment of a machine according to the invention.

FIGURE 2 is a side view corresponding to FIGURE 1,

Figure 3:
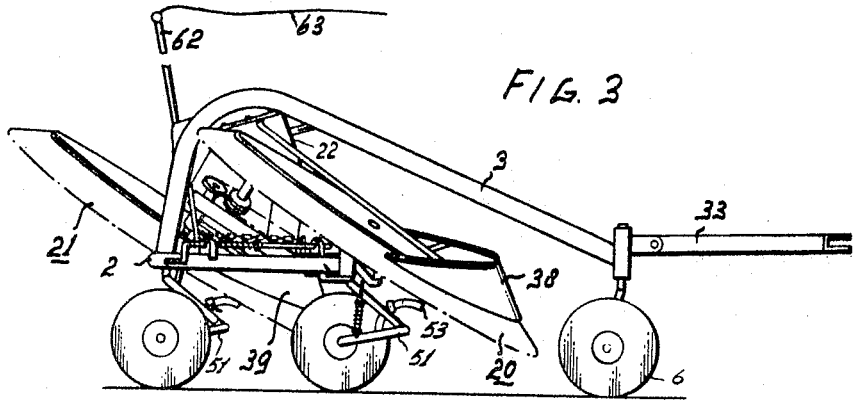
Figure 4:
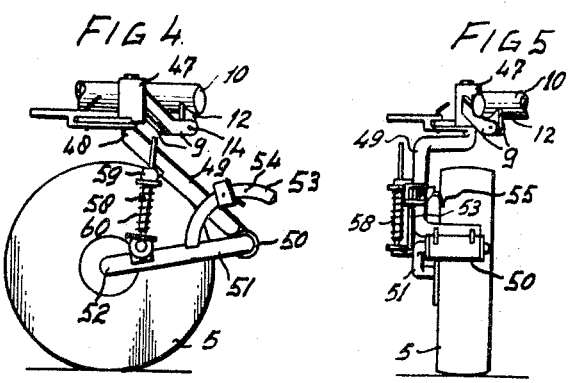
Figure 5:
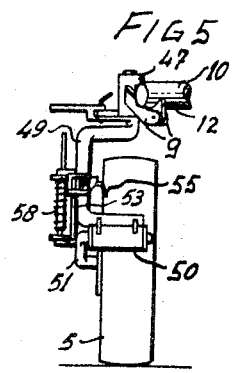
Figure 6:
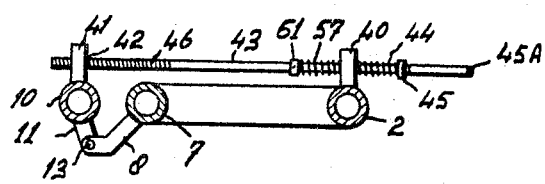

FIGURE 3 is a view similar to FIGURE 2 but showing the machine in its transport position, FIGURE 4 is a side view on an enlarged scale of a ground wheel of the machine shown in FIGURES 1 to 3, FIGURE 5 is a front view corresponding to FIGURE 4, FIGURE 6 is an enlarged sectional view taken on the line VI—VI of FIGURE 1, and FIGURE 7, which appears on the same sheet as FIGS. 1 and 2, is a side view of a detail of the machine shown in FIGURES 1 to 6.

The machine shown in the drawing comprises a frame 1 including two frame beams 2 and 3 and supported on three ground wheels 4, 5 and 6, of which the ground wheels 4 and 5 are arranged near the ends of the frame beam 2 and the ground wheel 6 near the front end of the frame beam 3. The frame beam 2 carries a supporting beam 7, which has a bifurcated bracket 8 at its free end, the end of the frame beam 2 near the ground wheel 5 having also a bifurcated bracket 9. To the brackets 8 and 9 there is secured a frame beam 10 by means of lugs 11 and 12 entered in the brackets 8 and 9 and fastened therein with aligned pins 13 and 14. Since the pins 13 and 14 are aligned, the beam 10 is capable of turning, in relation to the frame 1, about a hinge axis indicated at 15. Bearings 16 and 17 are disposed at the ends of the frame beam 10 and have shafts 18 and 19 of rotatable raking devices 20 and 21 mounted therein, so that the shafts of the raking devices occupy fixed relative positions. The raking devices 20 and 21 are driven from a gear-box 22 also arranged on the beam 10. The shafts 18 and 19 carry sprocket wheels 23 and 24, which are connected by means of chains 25 and 26, with sprocket wheels 27 and 27A mounted on the gear-box 22. The latter has three input shafts 28, 29 and 30, which can be connected, for example, with the power take-off shaft of a tractor used for towing the machine. The gear-box 22 is so constructed that when the shaft 28 is coupled to the power take-off shaft, the raking devices 20 and 21 will be rotated in the direction of the arrows 31, whereas, when either of the shafts 29 or 30 is so coupled, the raking devices 20 and 21 will rotate in the direction of the arrows 32. When the shaft 30 is employed, with the same speed of input drive, the raking devices will rotate more rapidly than when the shafts 28 and 29 are employed. The raking devices 20 and 21 are disposed along a line which lies transverse to the intended direction of travel of the machine (indicated by the arrow I), the axis of rotation of the devices being parallel and distant one from the other, as measured in a direction perpendicular to the line travel I, less than the diameter of a raking device but greater than the radius thereof. Hence the raking devices overlap and when they rotate in the direction of the arrows 31, and the machine is towed in the direction indicated by the arrow I with the aid of a drawbar 33 provided at the front end of the frame beam 3, the machine will operate as a side-delivery rake, the raking device 20 displacing crop towards the device 21, and the latter, in turn, displacing the crop to the left to form one windrow.

In order to ensure a adequate working width during movement in the direction I, the raking devices 20 and 21 are formed as tined rake wheels, both of diameter about 1.60 metres, and both arranged so that they rotate with the tips of their tines 35 in planes which intersect the ground along a line transverse to the intended direction of travel of the machine, and which are inclined to the ground at an angle of about 30° to 60°. Such angle is indicated at 34 in FIGURE 2, and it will be noted that the rake wheels each have a lower region in contact with the ground, from which region, the inclined plane containing the tine tips extends upwardly and rearwardly with reference to the direction of travel of the machine.

The inclination of the rake wheels ensure that many more tines 35 thereof will contact the ground than if the rake wheels were vertical, so that the working width of one rake wheel is considerably larger than that of a similar, but vertically disposed, rake wheel. Moreover, the inclined position has the advantage that the tines move upwardly and backwardly at the location in a rake wheel where the crop has to be shed from the tines. Correct shedding of the crop can be further ensured by directing the tines 35 so that the tips thereof point backwardly with reference to the directions of rotation 31 or 32. As is indicated for the tines 35 in FIGURE 1, the rake wheel is suitable for being driven in the direction of rotation 31. The tines 35 are, however, constructed so that they are adjustable and can be brought to settings where they point backwardly with reference to the direction of rotation 32.

It is advantageous to construct the inclined rake wheels so that the peripheral parts thereof can yield resiliently in directions parallel to the axes of rotation of the wheels in order to accommodate unevennesses in the ground.

When the machine travels in the direction I and the rake wheels 20 and 21 rotate in the directions shown by the arrows 32, each rake wheel, independently of the other, will displace crop to the right-hand side, so that the machine acts as a swath turner or tedder, the crop being turned or spread over the field to promote drying. In order to spread the crop so that it is deposited over a great area in an aerated condition, the rake wheels 20 and 21 are driven, via the gear-box 22, from the shaft 30 which is coupled to the power take-off shaft of the tractor, the rake wheels rotating more rapidly than if driven from the shaft 29. Owing to the rapid rotation of the rake wheels, the crop will be worked more vigorously by the tines 35 and will be satisfactorily disentangled to promote drying thereof. This higher speed of revolution of the rake wheels can be utilised with particular success, if the crop to be worked is very damp and tends to stick to the ground because of rainy weather.

Each rake wheel includes a rim 36 and spokes 37, and in order to prevent the crop, when the machine is in use, from rising up onto the upper sides of the inclined rake wheels, screening baffles 38 and 39 are arranged above the wheel surfaces. If the crop were allowed to rise into the wheel surfaces, it would be carried along upwardly thereby and finally dropped onto the ground which had previously been cleared, which would be most undesirable particularly in the case of side-delivery raking. The tines 35 of each rake wheel are situated on a conical surface the axis of which coincides with the rotational axis of the rake wheel. Each tine can yield resiliently, turning about the axis of its radial spoke 37.

In order to adjust the backward inclination of the rake wheels 20 and 21 according to various kinds of work to be done and to the crop to be worked, screw and nut adjusting mechanism is provided between the frame beams 2 and 10. Thus the frame beam 2 is provided with a bearing 40 and the frame beam 10 with a lug 41 having an internally screw-threaded hole 42. In the bearing 40 is journalled a spindle 43, on which a spring 44 and a collar 45 are mounted on one side of the bearing 40, and a spring 57 and a collar 61 on the other side thereof. The spring 44 tends to lift the rake wheels and hence prevents them from bearing on the ground with excessive pressure. The springs 44 and 57 together allow the rake wheels to float and hence to accommodate unevennesses in the ground. At one end the spindle 43 is provided with a crank 45A, whilst the other end has screw-threading 46, and is entered in the hole 42. By turning the spindle 43 with the aid of the crank 45A, the screw-threading 46 will cause the lug 41 to be displaced, so that the beam 10 will turn about the hinge axis 15. When the beam 10 turns about the hinge axis 15, the rake wheels 20 and 21 which are carried on the frame beam 10, will swing about the axis 15 and occupy a more or less inclined position and change the pressure of the tines on the ground. Since the gear-box 22 is also mounted on the beam 10, the drive to the rake wheels, when they are adjusted about the hinge axis 15, will not be affected by the adjustment. Apart from adjusting the rake wheels, they may be turned about the hinge axis 15 to such an extent that they are freed from the ground, so that a transport position is reached as is shown in FIGURE 3, the rake wheels then occupying a more nearly horizontal position. This transport position can be attained by pulling forwardly one end of a lever 62 by means of a cable 63 (see FIGURE 7). The lever 62 is pivotally supported at 62A upon a plate fixed to the frame beam 3, the bottom end of the lever being connected by a chain 62B with an arm 62C fixed on the beam 10. A locking device 64 of known construction is provided for holding the lever 62 in its forward position. The locking device can be released by a forward pull upon the cable 63.

As shown in FIGURES 1, 4 and 5 a bearing 47 is provided one at each end of the frame beam 2, a vertical shaft 48 being journalled therein so as to be turnably adjustable and fixable. The shaft 48 has a downwardly sloping portion 49 carrying at its lower end a bearing 50 in which the cranked, horizontal, end portion of a bar 51 is journalled. The other end portion 52 of the bar is also cranked and forms a horizontal axle for the wheel 5, the axis of rotation afforded by such axle being situated behind (with reference to the direction of travel of the machine) the vertical axis of adjustment afforded by the bearing 47, and also behind the pivotal axis of the pivotal connection afforded by the bearing 50. In order to fix the bar 51 with the ground wheel 5 in different positions relative to the frame by swinging the bar 51 about the axis of the bearing 50, the bar 51 carries an arcuate strip 53 formed with holes 54. The portion 49 of the shaft 48 has a staple 55A fixed thereon, the strip 53 being arranged to slide in the staple and to be fixed in a desired position by entering a locking pin 55 in any one of the holes 54. In this way the wheel 5 may be adjusted in relation to the frame of the machine to vary the height of the frame above the ground, the adjustment being about an axis parallel to the wheel axis, but in front thereof.

Adjustment of the bar 51 about the axis of the bearing 50 can be readily effected because it is supported by a spring strut consisting of a rod 58 pivotally connected at one end to the bar and passing at the other and through a swivel 59 mounted on the portion 49 of the shaft 48. A compression spring 60 surrounds the rod 58 and is effective between the swivel 59 and the lower end of the rod 58, and hence urges the ground wheel away from the machine frame. Thus, when the locking pin 55 is released, the machine can be resiliently supported during operation. The possibility of vertical adjustment of the rake wheels can be utilised to advantage in the different ways of working hay, for example, in swath turning, tedding and spreading of windrows. Only the mounting for the ground wheel 5 has been described, but it will be understood that a similar mounting is provided for the ground wheel 4.

It will be noted that each of the ground wheels 4 and 5 is associated with one of the rake wheels 20 and 21, so that each ground wheel lies behind and beneath a rake wheel, the axis of rotation of each ground wheel being located in front of the point at which the axis of rotation of its associated rake wheel intersects the ground (see FIGURE 2).

The arrangement of the tines 35 is such that, near the ground, viewed transversely to the direction of travel, they are substantially vertical (see FIGURE 2). The hinge axis 15 extends substantially parallel to the line joining the centres of the rake wheels 20 and 21 and is located as near as possible to such line.

What we claim is:

1. An implement adapted to be pulled by a tractor and comprising frame means including hitch means to couple the implement to said tractor and ground wheels supporting said frame means, a frame beam adjacent said frame means and pivotally connected thereto, shafts disposed adjacent the ends of said beam and inclined upwardly and forwardly at an acute angle relative to the ground, raking members having tines thereon rotatably mounted on said shafts such that the tines in the forward area of the raking members are substantially vertical when in contact with ground and/or crop, such raking members each being disposed in a plane extending at an acute angle relative to the ground with one of said ground wheels therebeneath, a gear-box mounted on said beam and means connecting said gear-box to each raking member to rotate same in one direction so that the implement constitutes a side delivery rake, or in a reverse direction so that the implement constitutes a tedder.

2. An implement as claimed in claim 1 comprising bearings on said frame beam mounting said shafts therein, and wherein said hitch means comprises a drawbar connected to said frame means at the front thereof.

3. An implement as claimed in claim 1 wherein the gear-box is disposed above said raking members.

4. An implement as claimed in claim 1 comprising means in said gear-box for changing the rotational speed of the raking members.

5. An implement as claimed in claim 1 wherein said frame beam is pivotable relative to said frame means so as to change the inclination of the raking members with respect to the ground.

6. An implement as claimed in claim 1 comprising a crank having a screw-thread and a nut coupled to said frame beam for adjusting the inclination of the raking members.

7. An implement comprising a frame and at least two rotatable raking members mounted on said frame and provided with tines extending to the ground, each of said raking members being arranged for rotation in a plane which lies substantially transverse to the intended direction of travel of the implement and which is inclined to the horizontal at an angle such that the tines of the raking members can engage the ground and/or the crop lying thereon, said planes extending upwardly and rearwardly with respect to said intended direction of travel, the frame including two ground wheels each of which is arranged beneath a raking member, the axis of rotation of each of said ground wheels being situated in the intended direction of travel of the implement, in front of the point of intersection of the axis of rotation of the associated raking member with the ground.

8. An implement as claimed in claim 7 wherein said ground wheels arranged beneath the raking members are situated beneath the central portion of said raking members.

9. An implement as claimed in claim 7 comprising means for adjusting the height of the ground wheels with respect to the frame.

10. An implement as claimed in claim 7 comprising means supporting each ground wheel for pivotal movement about a vertical axis which is situated, viewed in the intended direction of travel of the implement, before the axis of rotation of said ground wheel.

11. An implement for laterally displacing crop lying on the ground comprising a frame, and at least one rotatable raking member mounted on said frame and provided with tines, said raking member being adapted for rotation in a plane which lies substantially transverse to the intended direction of travel of the implement and which is inclined to the horizontal such that the tines o the raking member can engage the ground and/or the crop lying thereon, the plane extending upwardly and rearwardly with respect to said intended direction o travel, the frame including a ground wheel arranged underneath said raking member, an arm supporting said ground wheel, said arm being connected with said frame for pivotal movement about an axis which is substantially parallel to the axis of rotation of the ground wheel, and means to adjust the arm about the pivotal axis thereof to adjust the spacing of the ground wheel from the frame thereof.

12. An implement as claimed in claim 11 wherein the said axis about which the ground wheel is pivotable is situated, as viewed in the intended direction of movement of the implement, in front of the axis of rotation of the ground wheel.

13. An implement as claimed in claim 11 comprising spring means connected between the frame and the ground wheel to urge the ground wheel downwardly.

14. An implement as claimed in claim 11 wherein a plurality of raking members are provided and a ground wheel is situated underneath each raking member.

15. An implement as claimed in claim 11 wherein the ground wheel is a caster wheel.

References Cited by the Examiner

UNITED STATES PATENTS 2,827,754  3/1958  Hill _____ 56—377

FOREIGN PATENTS 803,214  10/1958  Great Britain.

OTHER REFERENCES

German printed application No. W12764, III/45c, November 1955.

ABRAHAM G. STONE, *Primary Examiner.*

RUSSELL R. KINSEY, *Examiner.*